A. BERNEY.
Coffee Pot.
No. 87,903.  Patented March 16, 1869.
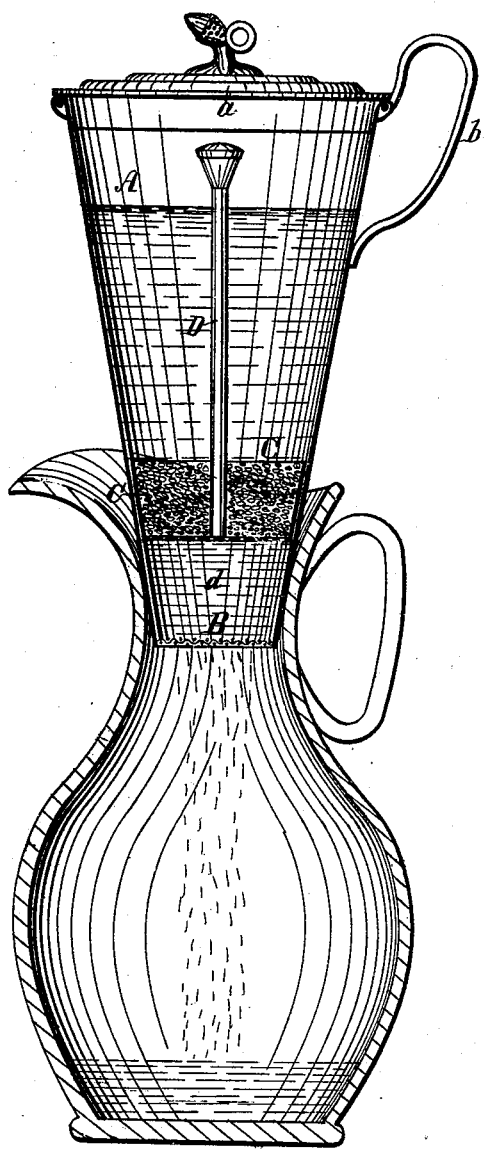
Witnesses.
Inventor.

ALFRED BERNEY, OF JERSEY CITY, NEW JERSEY.

Letters Patent No. 87,903, dated March 16, 1869.

IMPROVEMENT IN VESSELS FOR MAKING COFFEE.

The Schedule referred to in these Letters Patent and making part of the same.

*To all whom it may concern:*

Be it known that I, ALFRED BERNEY, of Jersey City, in the county of Hudson, and State of New Jersey, have invented a new and useful Coffee-Cone, or Vessel for Making Coffee, of which the following is a full, clear, and exact description, reference being had to the accompanying drawing, forming part of this specification, and which represents a sectional elevation of a coffee-cone, constructed in accordance with my invention, and as applied to the mouth of a pitcher.

Coffee, as a beverage, is more dependent, perhaps, for its excellence, upon the manner in which it is made, than upon the quality of the berry from which it is produced.

Coffee, to be good, should never be boiled, nor be made too long in advance of its being required for use; otherwise it loses much of its fine aromatic flavor.

My invention not only meets these requirements, but combines with it numerous important advantages, such as freedom from grounds, and much convenience in use, together with great simplicity and cheapness.

It consists in a conical-shaped vessel, open at top and bottom, made, say, of tin, and that should be provided with a lid and handle at its upper and larger end, while it has fitted within it, in a close but removable manner, a filter, or filtering-bucket, that is pressed down to its place within the cone, or vessel, so as to occupy a position some little distance from the lower end of the latter, and is drawn out, when required, by an upwardly-projecting rod, or handle, said screen, or filter, preferably, in its operation, or use, having, combined with it, a finer screen, or filter, applied to the lower and smaller end of the cone, or conical-shaped vessel. By a "coffee-cone," thus constructed, all the advantages sought to be attained are secured.

Referring to the accompanying drawing—

A is the cone proper, or tapering-shaped vessel, made of any desired height and capacity, and so, that when inserted, at its smaller end, in the mouth of, say, an earthenware pitcher, or table-pot, it will firmly rest, or be seated therein.

Said vessel is provided, at its top, or larger end, with a lid, *a*, and handle, *b*, and is also shown as fitted, at its lower end, with a fine screen, or filter, B.

C is a coarser screen, or filter, which may be mounted with a tapering-shaped ring, *c*, of a size and configuration, so that when pressed down within the cone A, it is made to establish a close fit therein, at some little distance from the filter B, in the lower end of the cone, leaving a space, *d*, between the two filters, B and C. This last-mentioned filter, or filtering-bucket C, is thus adjusted to its place, and withdrawn from the cone A by pressing down, or pulling on a rod, or handle D, projecting upward from said screen, or filter.

To use the "coffee-cone," as thus constructed, the cone A is seated in the mouth of a pitcher, or table-pot, as described, and the filter C pressed home to its place, after which the necessary quantity of ground coffee is put in, or on to said filter, and boiling water, from an ordinary tea-kettle, poured into the cone, and the lid *a* closed, which preserves the aroma.

The coffee, as it is made by percolating through the ground mass, trickles down into the pitcher beneath, leaving the grounds on the screen above.

The use of employing two filters, the one, C, coarse, and the other, B, fine, with a space, *d*, between them, more effectually guards against all passage of grounds, without objectionably retarding the flow of the water through the ground coffee, as, although grounds, to a small extent, may pass the first filter, C, they will never collect in sufficient quantity on the finer and lower filter, B, to obstruct the flow.

The taper-shape of the vessel A not only readily adapts it to different-sized pitchers, or table-pots, but facilitates the close fit, or entry, and easy removal, when necessary to empty the grounds and clean the vessel, of the filter, or filtering-bucket C.

Superior coffee may thus rapidly and conveniently be made on the table, as it is wanted, without loss of aroma, also, of varied strength, by pouring more or less water into the cone, and free of all grounds. After the coffee has been run off into the pitcher, or table-pot, the vessel A, with its filter, or screens, is removed.

The cone is especially designed to use in combination with earthen, stone, or china pitchers, and water, or tea-pots, as, by experiments well known to chemists and medical men, coffee, allowed to remain in tin, absorbs a peculiar flavor from it, that is injurious to the flavor, and to the person drinking it.

I am aware that filters have been made in connection with a boiler, or coffee-pot, as, for instance, the device known as Count Rumford's. These I do not claim.

What is here claimed, and desired to be secured by Letters Patent, is—

The conical vessel A, having a finely-perforated bottom, B, and the bucket *c*, with perforated bottom, C, arranged therein, substantially as shown and described, as a new article of manufacture.

ALFRED BERNEY.

Witnesses:
  A. LE CLERC,
  A. KINNIER.